United States Patent [19]

Mintz et al.

[11] 4,435,261

[45] * Mar. 6, 1984

[54] POLYMERIZATION REACTION BY CHARGE INJECTION

[75] Inventors: Donald J. Mintz, Fort Lee; Arnold J. Kelly, Princeton Junction; Anthony M. Gleason, Westfield, all of N.J.

[73] Assignee: Exxon Research and Engineering Co., Florham Park, N.J.

[ * ] Notice: The portion of the term of this patent subsequent to Mar. 10, 1998 has been disclaimed.

[21] Appl. No.: 287,411

[22] Filed: Jul. 27, 1981

[51] Int. Cl.³ .......... C25B 3/00

[52] U.S. Cl. .......... 204/168

[58] Field of Search .......... 204/165, 168, 169

[56] References Cited

U.S. PATENT DOCUMENTS

| | | | |
|---|---|---|---|
| 2,045,343 | 6/1936 | Darrah | 204/169 |
| 2,229,679 | 1/1941 | Slayter | 204/169 X |
| 2,583,898 | 1/1952 | Smith | 204/168 |
| 3,328,235 | 6/1967 | Schimkus | 162/175 |
| 3,668,096 | 6/1972 | Cook | 204/165 |
| 4,255,777 | 3/1981 | Kelly | 361/228 |

*Primary Examiner*—F. Edmundson

*Attorney, Agent, or Firm*—Richard E. Nanfeldt

[57] ABSTRACT

This invention relates to a process for the free radical polymerization of at least one monomer into a polymeric substance by a charge injection means, wherein the monomer or the solution of monomer and oil is disposed within the chamber of a cell of an electrostatic atomizing device which includes the aforementioned cell and chamber a discharge spray means in communication with the cell, the formed polymer being transported to the discharge spray means and atomized into droplets, and a mechanism for passing a charge through the monomer or solution of monomer within the chamber, wherein the charge is sufficient to induce free radical polymerization of the monomer.

6 Claims, 2 Drawing Figures

POLYMERIZATION REACTION BY CHARGE INJECTION

FIELD OF THE INVENTION

This invention relates to a process for the free radical polymerization of at least one monomer into a polymeric substance by a charge injection means, wherein the monomer or monomers or the solution of monomer or monomers and oil is disposed within the chamber of a cell of an electrostatic atomizing device which includes the aforementioned cell and chamber, a discharge spray means in communication with the cell, the monomer or the solution of monomers in a polymerized form being transported to the discharge spray means and atomized into droplets which contain polymerized material, and a mechanism for passing a charge through the monomer within the chamber, wherein the charge is sufficient to induce free radical polymerization of the monomer. This invention constitutes a process in which excess electrons are injected directly into a monomer to bring about chemical reactions. These electrons can act as free radical initiators for polymerizations. They can also become solvated and bring about reduction reactions. A device known as the Spray Triode is used to inject the excess charge into a solution of oil and monomer to initiate polymerization. This device works on the principle that excess electrons can be induced to be emitted from sharply pointed surfaces in the presence of an adequate electric field. The emitted electrons are then swept away by a cross flow of solution to yield a solution with excess electrons.

BACKGROUND OF THE INVENTION

In U.S. Pat. No. 4,255,777, the electrostatic atomizing device of the instant invention is described. U.S. Pat. No. 4,255,777 is herein incorporated by reference. This application, U.S. Pat. No. 4,255,777, fails to imply, infer or even remotely contemplate the use of the charge injection electrostatic atomizing device as means for polymerizing monomers into polymers.

SUMMARY OF THE INVENTION

This invention relates to a process for the free radical polymerization of at least one monomer into a polymer by a charge injection means, wherein at least one monomer or the solution of at least one monomer and a hydrocarbon such as an oil is disposed within the chamber of a cell of an electrostatic atomizing device which includes the aforementioned cell and chamber, a discharge spray means in communication with the cell, the solution in a polymerized form being transported to the discharge spray means and atomized into droplets, and a mechanism for passing a charge through the monomer or the solution of at least one monomer within the chamber, wherein the charge is sufficient to initiate free radical polymerization of the monomer.

GENERAL DESCRIPTION

The electrostatic charging device of the instant invention, which is used to polymerize at least one monomer into a polymeric substance, includes a cell having a chamber therein with a discharge means disposed at one end of the cell, wherein the monomer or the solution of at least one monomer and oil to be polymerized is disposed within the chamber and is emitted as a charged stream or as charged particles from the discharge spray means. Charge injection occurs which is sufficient to generate a free excess charge in the monomer or the solution of monomer and oil, and is passed through the solution within the chamber. The convective flow velocity of the monomer or the solution of monomer within the chamber and the mobility controlled current flow velocity within the chamber can be arranged to permit the excess free energy charge to be effectively transported to the discharge means.

The current source usable for producing the charge means within the chamber of the cell can be a direct voltage, an alternating voltage, or a pulsed voltage source, and mixtures thereof, of about 100 volts to about 1000 kilovolts, more preferably about 100 volts to about 50 kilovolts DC, most preferably about 100 volts to about 30 kilovolts DC. The charge induced into the solution within the cell can be colinear or at an angle of intersection to the convective flow velocity of the liquid within the chamber, wherein the convective flow velocity of the solution can be less than, equal to, or greater than the mobility controlled current flow velocity of the charge within the cell. The electrical charge introduced into the monomer or the solution of monomer within the cell must be sufficient to generate free excess charge in the monomer or the solution of monomer within the chamber, wherein the charge can be negative or positive.

The exit stream or formed droplets which included polymerized material exiting from the discharge spray means can be accelerated outwardly from the discharge spray means without any substantial stagnation, or emitted from the discharge spray means in a swirl configuration, or emitted from the discharge spray means in a planar configuration. The formation of the charged droplets can occur either within the spray discharge means or externally thereto.

Heating or cooling means can be provided for controlling the rate of polymerization and the viscosity of monomer or the solution of monomer within the chamber of the cell, wherein the heating or cooling means can be a jacketed cell having a heated liquid oil or a refrigerant liquid disposed therein, or alternatively for the heat means convective hot air can be impinged on the cell or electrical heating elements embodied in the wall of the cell or disposed within the solution within the chamber of the cell. The control of the rate of polymerization and viscosity of the monomer or the solution of monomer within the chamber of the cell could permit a wide range of materials to be employed as well as a means for controlling the flow rates of the solutions. A liquid pump means could be joined in a serial fluid communication to the cell for the creation of a positive pressure on the monomer or the solution of monomer within the cell thereby providing a means for the regulation of the flow rate. A supply tank can be joined in a serial fluid communication to the electrostatic atomizing device by means of a conduit having a metering value disposed therein.

The monomers are polymerized by the free radical reaction within the chamber of the cell of the electrostatic atomizing device, wherein the monomer or the solution of monomer and oil are disposed within the chamber of the cell of the electrostatic atomizing device.

The monomer or monomers or the solution of monomer or monomers and a hydrocarbon such as an oil to be polymerized in the instant invention comprise at least one type of monomer, wherein the formed polymeric materials can be homopolymers, copolymers or terpolymers. The monomers to be polymerized are selected from the group consisting of styrene, t-butyl-styrene, chlorostyrene, alpha methyl styrene, acrylonitrile and vinyl toluene and mixtures thereof, wherein the polymerization of these monomers produce polymers selected from the group consisting of polystyrene, poly-t-butyl-styrene, polychlorostyrene, polyalphamethyl styrene and co- or terpolymers of the aforementioned with acrylonitrile or vinyl toluene.

Other suitable monomers capable of undergoing free radical polymerization in the instant process are selected from the group consisting of acrylonitrile, methacrylonitrile, alkylmethacrylate such as methylmethacrylate, vinyl acetate, acrylamide, methacrylamide, alkyl acrylate such as methyl acrylate, vinylidene chloride, vinyl chloride, vinyl fluoride, and vinylidene fluoride and mixtures thereof or in mixture with styrene or vinyl toluene.

The polystyrene resins formed by the polymerization process of the instant invention have a glass transition temperature from about 90° C. to about 150° C., more preferably about 90° C. to about 140° C. and most preferably about 90° C. to about 120° C. These polystyrene resins have a weight average molecular weight as measured by GPC of about 5,000 to about 500,000, more preferably about 20,000 to about 350,000 and most preferably about 40,000 to about 300,000.

The oils employed in forming the solutions of monomer and oil are non-polar backbone process oils having less than about 3.5 wt.% polar type compounds as measured by molecular clay gel analysis. These oils are selected from paraffinics ASTM Type 104B as defined in ASTM-D-2226-70, aromatic ASTM Type 102 or naphthenics ASTM 104A, wherein the oil has a flash point by the Cleveland open cup of at least 350° F.; a pour point of less than 40° F., a viscosity of about 70 to about 3000 s.s.u.'s and a number average molecular weight of about 300 to about 1000, more preferably about 400 to about 75°. The preferred oils are naphthenics. Table I illustrates typical oils encompassed by the scope of this invention.

TABLE 1

| Type Oil | Oil Code # | Viscosity ssu 100° F. | $\bar{M}n$ | % Polars | % Aromatics | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 506 | — | 0.9 | 20.8 | 78.3 |
| Naphthenic | Flexon 580 | 1855 | — | 3.3 | 47.0 | 49.7 |
| Paraffinic | Marcol 87 | 110 | — | 0.0 | 0.0 | 100.0 |

The concentration of at least one monomer in the oil is about 5 to about 25 parts by weight of monomer per 200 parts by weight of the oil, more preferably about 5 to about 20, and most perferably about 5 to about 15.

The process generally comprises the placement of the monomer, the solution of oil and at least one monomer in the chamber of the cell of the electrostatic atomizing device, the subsequent injection of the excess charge into the monomer or the solution of monomer which is sufficient to induce initiation of polymerization of the monomer. The formed polymer is transported to the discharge means and can be atomized into droplets and the subsequent discharge of the charged droplets containing polymerized material from the discharge means.

BRIEF DESCRIPTION OF THE DRAWINGS

For a more complete understanding of the instant invention, reference is made to the accompanying drawings, in which.

DESCRIPTION OF THE PREFERRED EMBODIMENTS

Figure 1:
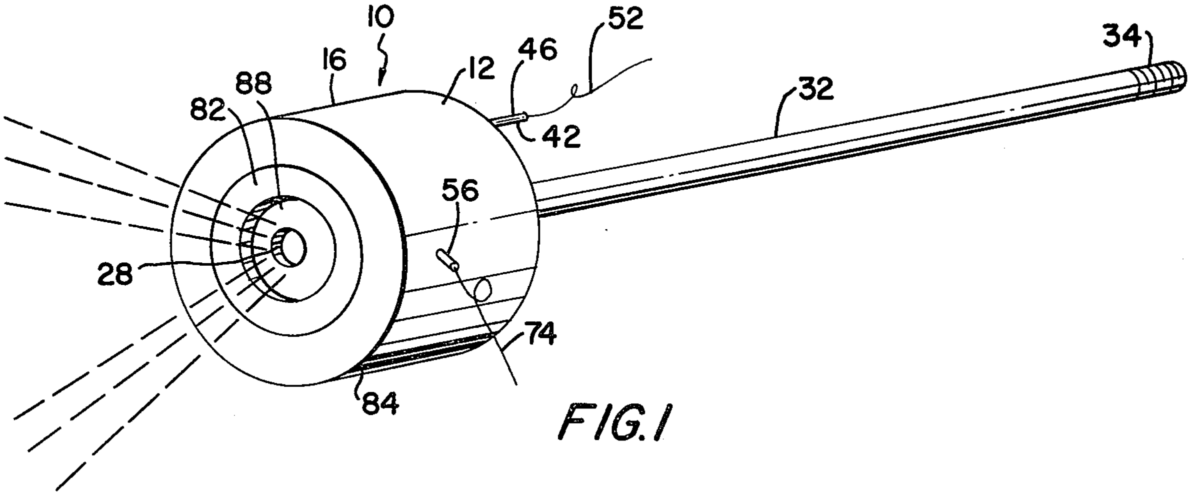
FIG. 1 illustrates a perspective view of an electrostatic atomizing device.
Figure 2:
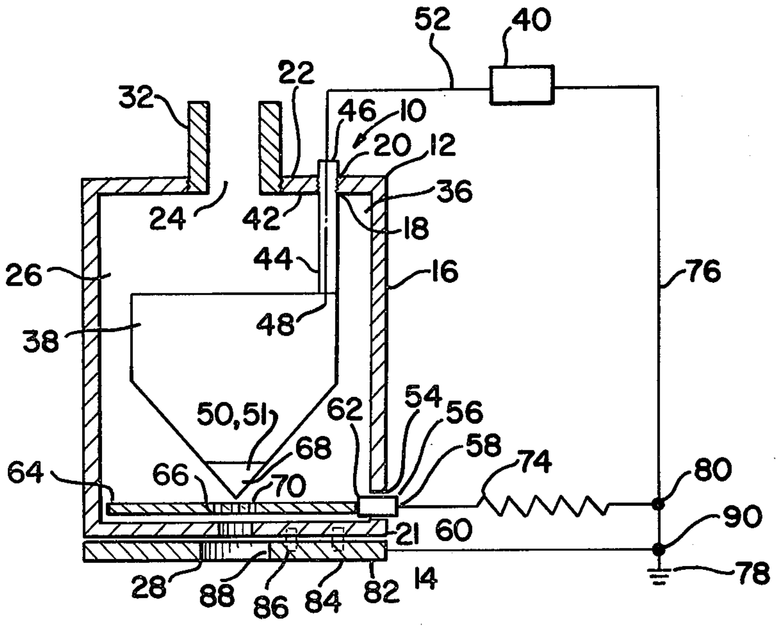
FIG. 2 illustrates a cross section view of the electrostatic atomizing device.

FIGS. 1 and 2 show a typical electrostatic atomizing device 10 which can be employed for the free radical polymerization of monomers into homopolymers, copolymers and terpolymers; however, the instant description of the device 10 is not meant to be limiting in scope and obviously other devices 10 as described in U.S. Pat. No. 4,255,777, herein incorporated by reference, are readily employable in the free radical polymerization process of the instant invention.

Turning now descriptively to the drawings, in which similar reference characters denotes similar elements throughout the views of the different embodiments, FIGS. 1 and 2 show the electrostatic atomizing device 10 which includes a cylindrically shaped non-conductive housing (cell) 12 (e.g. Lucite) having a base 14, an upwardly extending cylindrically shaped sidewall 16 with a threaded aperture 21 therethrough, a top 22 with a threaded aperture 20 therethrough, a top 22 with a threaded hole 24 therethrough, and a chamber 26 disposed therein, wherein the base 14 has a center discharge opening 28 therethrough which is the discharge spray means. One threaded end 30 of a first cylindrically shaped liquid supply conduit 32 is threadably received into hole 24, wherein the conduit 32 extends linearly outwardly from the top 22 of the housing 12. The other threaded end 34 of conduit 32 is adapted to be joined to a solution supply means (not shown) whereby the solution of monomer and oil passes through conduit 32 into chamber 26, wherein the solution has a conductivity of less than about $10^4$ mho/meter, more preferably less than about $10^{-4}$ mho/meter, and most preferably less than about $10^{-10}$ mho/meter. A first non-conductive elongated cylindrically shaped tube 42 having an externally threaded surface 18 and a continuous bore therethrough is threadably disposed through threaded aperture 20, wherein one end 46 of tube 42 extends outwardly from housing 12 and the other end 48 of tube 42 extends inwardly into an upper portion of chamber 26. A first electrode 38 or a series of first electrodes 38 in parallel or in a parallel series combination is joined into the end 48 of tube 42 by suitable means such as an adhesive cement or the end 48 of tube 42 can be embedded into electrode 38, wherein electrode 38 has a setaceous surface 50 formed from a plurality of pins 51 which are in a substantially parallel alignment within the chamber 26. A setaceous surface is defined as one having a plurality of essentially parallel, similar continuous pins having lateral dimensions of 10μm, more preferably 1μm, most preferably 0.1μm or less in a ma;trix of nonconductor or semi-conductor material. Each pin is arrayed in a regular or almost regular pattern with mean separation distances of an order of about 35μm or less. An example of a suitable electrode 38, but not limiting in scope, is an eutectic mixture of uranium oxide and tungsten fibers as described in Journal of Crystal Growth 13/14, 765, 77 (1972) "Unidirectional Solidification Behavior in Refractory Oxide Metal Systems," A. T. Chapman, R. J. Geides. The first electrode 38 is connected in a series to a high voltage source 40 which is disposed externally to the housing 12, by means of a first electrical lead wire 52 extending through the bore 44 of the tube 42. The high voltage source 40 is wired by means of a ground wire 76 to a ground 78 disposed externally to device 10. A second non-conductive (e.g. Lucite) elongated cylindrically shaped tube 56 having a continuous bore 58 therethrough is disposed through aperture 21, wherein one end 60 of tube 56 extends outwardly from housing 12 and the other end 62 of tube 56 extends inwardly into a lower portion of chamber 26. A liquid tight seal is formed between tube 56 and widewall 16 by adhesive or other sealant means 54. A second electrode 64 or a series of second electrodes 64 in parallel or in series parallel combination are joined onto end 64 of tube 56 suitable means such as an adhesive cement or the end 62 of tube 56 can be embedded in electrode 64. The second electrode 64 is a planar shaped disc 66 having at least one center longitudinally aligned aperture 68 therethrough and optionally a plurality more of longitudinally aligned apertures 70 therethrough at prescribed distances from the center aperture 68; alternately a plurality of longitudinally aligned apertures 68 could be used arrayed symmetrically with respect to the center line with no aperture hold on the center line. The aperture holes could also be skewed to the center line. The second electrode 64 is disposed transversely within chamber 26 below and spaced apart from the first electrode 38. Electrode 38 can be moved longitudinally upwardly or downwardly thereby reducing or increasing the gap between the electrodes 38, 64 as well as modifying the flow or charge within the liquid. The second electrode 64 is preferably formed from platinum, nickel or stainless and is wired in series to a high voltage resistor element 72 disposed externally to housing 12 by an electrical lead wire 74 extending through tube 56. The resistor element 72 is connected at its opposite end to ground juncture 80 of the high voltage source 40. An external annularly shaped electrode 82 (e.g. stainless steel) can be affixed on the external bottom surface 84 of base 14 by adhesive means or by a plurality of anchoring elements 86 extending upwardly through electrode 82 and being embedded into base 14. The center opening 88 of electrode 83 and discharge opening 28 are aligned, wherein opening 28 is preferably less than about 2 cm in diameter, more preferably less than about 1 cm in diameter, most preferably less than about 6 mm in diameter, and the diameter of the center opening 88 is less than about 1 mm, more preferably less than about 600μm, and most preferably less than about 200μm. In this position, electrode 82 assists the spraying due to the development of the electrostatic field; however, the positioning of electrode 82 at this position is not critical to operation as long as this electrode 82 is disposed external to housing 12. The electrode 82 is also connected to a second grounded junction 90 disposed between ground 78 and the first electrical juncture 80. The first electrode 48 is negatively charged wherein the second electrode 64 has a relative positive potential with respect to the first electrode 38 and the external electrode 82 is at ground potential (the positive potential of source 40). In one mode of operation the first electrode 38 is negatively charged and the second electrode 62 and the external electrode 82 are relatively positively charged. The high voltage source 40 which can be a direct voltage, an alternating voltage, or a pulsed voltage source of either polarity, wherein the source is about 100 volts to about 100 kilovolts, more preferably about 100 volts to about 50 kilovolts DC, and most preferably about 100 volts to about 30 kilovolts D.C. The charge induced into the solution 36 of monomer and oil within the chamber 26 resuls in a flow from the first electrode 38 to the second electrode 62. The solution 36 within the chamber 26 polymerizes and flows towards the discharge opening 28 of the base 14, wherein the electrical charge which is induced into the solution 36 within the chamber 26 must be sufficient to generate excess free charge in the liquid within the chamber 26, thereby initiating polymerization of the monomer into a polymer, wherein the charge can be positive or negative. The solution containing polymer is emitted outwardly therefrom in a spray configuration, (as a plurality of droplets 92), wherein the external electrode 82 enhances acceleration of the chargeddroplets 92.

Example I

Polymerization of dilutestyrene monomer

In order to show the utility of the charge injection process in bringing about chemical reactions, a 10% solution of styrene monomer was prepared in the white oil Marcol 87. The change in the viscosity of this solution as a function of total electrical energy injected was used to derive the degree of polymerization attained. A viscosity increase equivalent to a molecular weight increase of approximately 90,000 was observed after 1.55 rads was applied. Two control experiments were performed. In the first, 100% Marcol 87 was subjected to the same electrical charge and did not show any viscosity increase. In the second, the free radical initiator methyl ethyl ketone peroxide was added to an aliquot of the 10% styrene solution and failed to produce any significant viscosity increase. From these results it was concluded that an unknown free radical trap was present and that the charge injection process was capable of overcoming the presence of this trap to effect the polymerization of styrene.

EXAMPLE II

Styrene monomer was obtained from J. T. Baker Chemical Co. This material is supplied with 10–15 ppm of the inhibitor 4-tert-butyl pyrocatechol present. In order to remove this inhibitor 2 g of calcium hydride was mixed with 1,000 ml of styrene and allowed to stand overnight. The resulting solution was then refluxed for one hour. The first 50 ml was distilled off under vacuum and discarded. The next 600 ml was collected and used in the experimental program.

The conditions for the distillation were the following. 1000 ml of the calcium hydride treated styrene was placed in a 200 ml two neck flask and fitted with a reflux condenser and magnetic stirrer. Reflux was performed under vacuum (100 mm Hg). The temperature reading in the flask was 83° C. A 600 ml middle cut was stored overnight at −65° C. 400 ml of a solution consisting of 10% of this middle cut and 90% Marcol 87 was prepared and sprayed through the Spray Triode with current off. Polymerization was attempted without charge injection. A 400 ml solution was recycled for 30 minutes without charge injection and a change in viscosity from 13.24 to 13.53 cp was measured on a Ubbelohde viscosimeter which indicates that no polymerization occurred. When the same solution and procedure was used with the charge injection process, the viscosity increased from 13.53 to 15.36 cp in 20 minutes and from 15.36 to 17.57 cp in the next 20 minutes which clearly indicates that polymerization has occurred. The electrical conditions were 4200 V and 0.55 μA. charging current.

What is claimed is:

1. A process for the free radical polymerization of liquid monomers into thermoplastic polymers, which comprises:

(a) introducing at least one monomer into a chamber of a cell of an electrostatic atomizing device, said electrostatic having a discharge spray means;

(b) means for injecting an electrical charge through said liquid monomer in said chamber, said electrical charge being sufficient to generate free excess charge in said liquid monomer to initiate polymerization of said monomer into a polymer within said chamber, said means including at least a first electrode and a second electrode disposed in said chamber, said first and second electrodes being in liquid contact with said monomer within said chamber, said first and said second electrodes being of different voltages;

(c) ejecting said charged thermoplastic polymer through said discharge spray means in the form of a stream or charged droplets; and (d) directing said formed stream or charged droplets towards a third electrode at a different potential and disposed externally to said housing for producing a high electric field in said thermoplastic polymer at said discharge spray means, said field being produced by a voltage differential between said thermoplastic polymer and said external electrode.

2. A process according to claim 1, wherein said liquid polymer is selected from the group consisting of styrene, t-butyl-styrene, chlorostyrene, alpha methyl styrene, acrylonitrile and vinyl toluene and mixtures thereof.

3. A process according to claim 1 or 2, wherein said liquid monomer is mixed with a hydrocarbon.

4. A process according to claim 3, wherein the concentration level of the liquid monomer in the oil is about 5 to about 25 parts by weight of the monomer per 100 parts by weight of the oil.

5. A process according to claim 1 further including a convective flow velocity of said liquid monomer and a mobility controlled current flow velocity of a current in said chamber arrayed such that said generated charge in said fluid is transported to said discharge spray means.

6. A process according to claim 1 or 2, wherein said liquid monomer is mixed with an oil.

* * * * *